Patented Oct. 23, 1928.

1,688,726

UNITED STATES PATENT OFFICE.

RALPH H. McKEE, OF NEW YORK, N. Y.

HYDROLYSIS OF METHYL CHLORIDE.

No Drawing.   Application filed September 7, 1922.   Serial No. 586,760.

This invention relates to the hydrolytic decomposition of organic chlorides, of which methyl chloride and amyl chloride are types, and comprises a process whereby this hydrolysis is readily effected, without the necessity of employing superatmospheric pressures, and with excellent yields of wood (or amyl) alcohol, and, usually in lesser proportion, of methyl ether. It is a distinguishing advantage of my process, that inasmuch as it is carried out in the gaseous phase it is applicable to the treatment of gas streams or currents in continuous flow, such streams comprising methyl chloride in admixture with methane or other gaseous hydrocarbons or gaseous diluents; so that the necessity inhering in prior processes of isolating methyl chloride from a complex mixture of non-chlorinated and more highly chlorinated hydrocarbons is entirely avoided. Other advantages inhering in my process will appear hereinafter.

Following is a preferred operation in accordance with my process, it being understood that I am not limited to the specific operating conditions set forth by way of example and illustration.

Methane, or a gaseous mixture high in methane, such for example as natural gas or methane mixtures prepared from water gas, is subjected to limited chlorination, less chlorin being used than is theoretically necessary for the monochlorination of all of the methane present. Under these conditions higher chlorination products (methylene dichlorid, chloroform, carbon tetrachlorid) are either absent or present in very minor proportions; and the resulting gas mixture consists essentially of methyl chloride, hydrochloric acid, and the unchanged excess of hydrocarbon gases. Minor proportions of chlorinated higher hydrocarbons are not such as to interfere with the subsequent operations. Hydrochloric acid may be removed by simple scrubbing.

The resulting gas is admixed with steam, which when methyl alcohol is sought as the principal product is preferably in volume approximately equal to the total gas mixture. This may be accomplished by bubbling the gas mixture thru water, maintained at the proper temperature to deliver a volume of steam approximately equal to that of the gas mixture. The resulting mixture is then passed over an alkaline-earth metal hydroxid, advantageously of porous type, contained in an aluminum tube or reactor and maintained at about 350°–375° C. The reaction which occurs under these conditions involves but little heat-change, and yields the chloride of the alkaline-earth metal, methyl alcohol and some methyl ether. The outflowing gases, suitably cooled, may be scrubbed to remove methyl alcohol (together with some methyl ether), and may then be contacted with a suitable absorbent for methyl ether, such for example as a heavy oil or sulfuric acid. The residual gas will be free from methyl alcohol and methyl ether, and, assuming sufficient time of contact with the alkaline-earth metal hydroxid to have been afforded, it will be substantially free from methyl chloride. Pure methyl alcohol, and some methyl ether, are obtained by distillation of the aqueous solution; while distillation of the heavy oil absorbent yields methyl ether. The methyl ether may, if desired, be converted into methyl alcohol by contacting with aluminum oxid at an elevated temperature and in admixture with a relatively large volume of steam, as disclosed in a copending application of Stephen P. Burke, filed concurrently herewith.

Among the hydroxids suitable for use in connection with this process are those of calcium, barium and magnesium, calcium hydroxid being preferred. This is readily prepared in a suitably porous state by slaking the lime with an excess of water to form a paste, drying this in vacuo at about 125° C., and thereafter grinding roughly to pass a four mesh screen and to be retained on fifty mesh. Aluminum hydroxid may be used, and is particularly advantageous in case larger proportions of methyl ether are desired. Accordingly the term "alkaline-earth metal hydroxid" is used herein to include equivalent hydroxids, as those of magnesium and aluminum, as well as the hydroxids of the alkali-earth metals, strictly so-called.

The optimum temperature for use with calcium hydroxid has been found to lie between 350° and 375° C., although the process is operative both above and below this range. At 300° C. the reaction is extremely slow.

As stated above, my preferred material for the reactor is aluminum, or an alloy of aluminum. Copper and iron are particularly to be avoided. Glass, porcelain, silica, etc., are less objectionable.

Methyl alcohol prepared as described herein is free from ketones, including acetone, and therefore yields on simple distillation an alcohol which is of higher purity than is now commercially available, and as such is especially desirable for formaldehyde manufacture.

Methyl chloride without admixture of steam passed at a suitable temperature over calcium hydroxid yields a small proportion of methyl alcohol, and a somewhat larger proportion of methyl ether; typical yields from this reaction being about 15% methyl alcohol, 35% methyl ether, with about 50% of unchanged methyl chloride. By admixing the methyl chloride or the gases containing the same with steam before contacting with the hydroxid, several important advantages are gained, as follows:

(1) The proportionate yield of methyl alcohol is greatly increased, amounting in a typical case as described above to seventy percent or more of the hydrolyzed product;

(2) The steam itself is an active hydrolyzing agent, directly converting a small proportion of the methyl chloride;

(3) The use of steam greatly facilitates the temperature control in the process;

(4) The calcium hydroxid is much more effectively utilized in the presence of steam, since in absence of steam considerable dehydration of the calcium hydroxide may occur;

(5) In presence of steam, and under the operating conditions, there is no appreciable cracking of the methyl alcohol to formaldehyde and hydrogen.

These several advantages are obtainable in varying degree over a wide range of variation in the steam content of the mixture, so that my invention is not limited in this respect, although the proportion mentioned above have been found satisfactory and economical in practice. Pressures either above or below atmospheric may be used, but I prefer in practice to employ pressures approximating atmospheric.

I claim:

1. Process of hydrolyzing methyl chloride, comprising passing the same, admixed with steam, and at an elevated temperature, over a hydrolyzing agent comprising an alkaline-earth metal hydroxid.

2. Process of hydrolyzing methyl chloride, comprising passing the same, admixed with steam and a gaseous diluent, and at an elevated temperature, over a hydrolyzing agent comprising an alkaline-earth metal hydroxid.

3. Process of hydrolyzing methyl chloride, comprising passing the same, admixed with steam, over calcium hydroxid, at a temperature approximating 350°–375° C.

4. The herein described process of preparing oxymethyl derivatives from methane, consisting in subjecting a methane-containing gas mixture to limited chlorination to form methyl chloride; removing hydrochloric acid from the resulting methyl chloride containing gas mixture, admixing the resulting gas mixture containing methyl chloride as its principal ingredient with steam and contacting the resulting methyl chloride and steam containing gas mixture with an alkaline-earth metal hydroxide at an elevated temperature to hydrolyze the methyl chloride.

5. Process according to claim 4, in which the methyl chloride and steam containing mixture is contacted with calcium hydroxid at a temperature approximating 350°–375° C.

6. Process of hydrolyzing an alkyl chloride, comprising passing the same, admixed with steam, and at an elevated temperature, over a hydrolyzing agent comprising an alkaline-earth metal hydroxide.

7. The method of producing alcohols which comprises passing an alkyl chloride admixed with superheated steam over an alkaline substance.

In testimony whereof, I affix my signature.

RALPH H. McKEE.